(12) United States Patent
Yabe et al.

(10) Patent No.: US 7,357,721 B2
(45) Date of Patent: Apr. 15, 2008

(54) DAMPER APPARATUS

(75) Inventors: Hiroshi Yabe, Kakegawa (JP); Dai Okamura, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/643,977

(22) Filed: Aug. 20, 2003

(65) Prior Publication Data

US 2004/0116190 A1 Jun. 17, 2004

Related U.S. Application Data

(63) Continuation of application No. 10/076,412, filed on Feb. 19, 2002, now abandoned, which is a continuation of application No. 09/573,941, filed on May 19, 2000, now abandoned.

(30) Foreign Application Priority Data

May 20, 1999 (JP) ................................. 11-139802

(51) Int. Cl.
*F16D 3/66* (2006.01)
(52) U.S. Cl. ..................................... 464/68.1; 192/212

(58) Field of Classification Search ............... 192/3.29, 192/212; 464/66–68, 66.1–68.9; 74/574
See application file for complete search history.

(56) References Cited

U.S. PATENT DOCUMENTS

| | | | |
|---|---|---|---|
| 1,646,772 A | 10/1927 | Sheppy | 464/66 |
| 4,440,276 A | 4/1984 | Kubo et al. | 192/3.29 |
| 4,986,398 A | 1/1991 | Olsen | 464/68 X |
| 5,289,737 A | 3/1994 | Kuhne | 74/574 |
| 5,513,731 A | 5/1996 | Matsuoka | 192/3.29 |
| 5,653,639 A * | 8/1997 | Gassmann | 464/68 X |
| 6,186,898 B1 | 2/2001 | Lopez | 464/68 |
| 6,223,625 B1 | 5/2001 | Ara et al. | 464/68 X |
| 6,306,043 B1 | 10/2001 | Annic et al. | 464/62 |
| 6,743,105 B2 * | 6/2004 | Yabe | 464/68 |

FOREIGN PATENT DOCUMENTS

| | | | |
|---|---|---|---|
| DE | 198 41 456 | * | 4/1999 |
| WO | WO98/45616 | * | 10/1998 |

* cited by examiner

*Primary Examiner*—Greg Binda
(74) *Attorney, Agent, or Firm*—Miles & Stockbridge P.C.

(57) ABSTRACT

In a damper apparatus including springs, a holder for holding the springs, and a plate having pawls engaged by the springs, splines are provided on an inner peripheral portion and an outer peripheral portion of the damper apparatus.

3 Claims, 2 Drawing Sheets

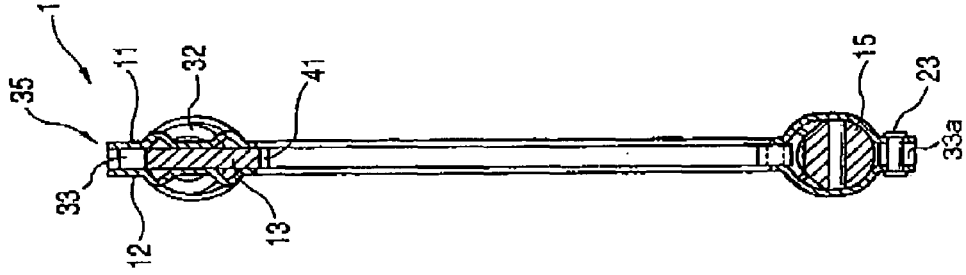
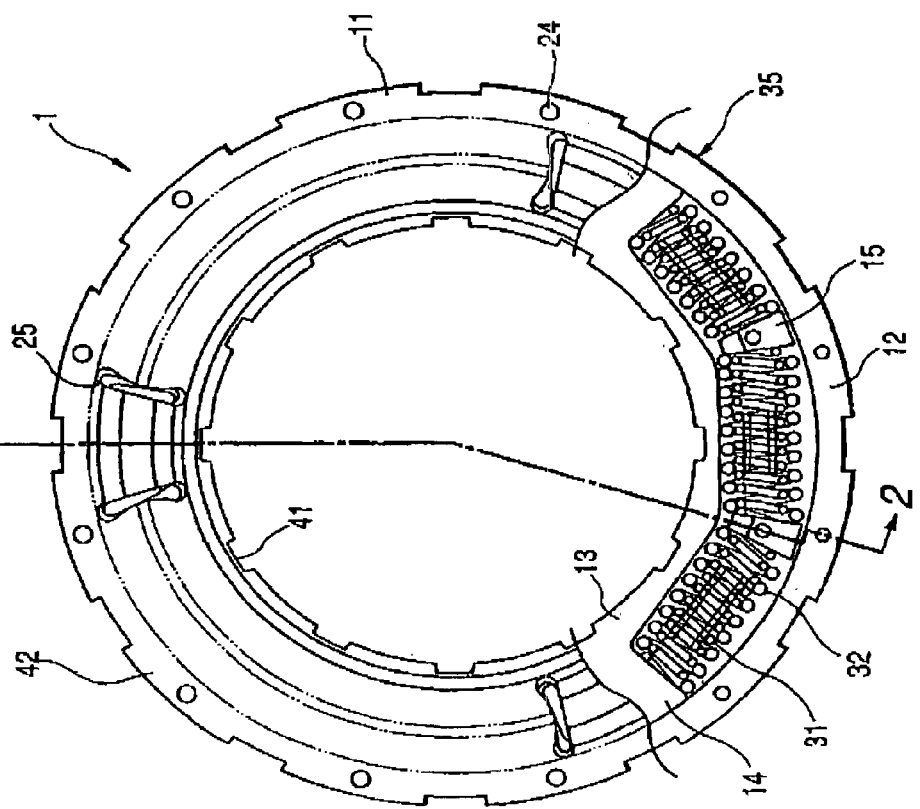

DAMPER APPARATUS

CROSS-REFERENCE TO RELATED APPLICATION

This application is a continuation of application Ser. No. 10/076,412 filed Feb. 19, 2002 (abandoned), which is a continuation of application Ser. No. 09/573,941 filed May 19, 2000 (abandoned).

BACKGROUND OF THE INVENTION

1. Field of the Invention

The present invention relates to a damper apparatus which is used in a torque converter or a starting clutch used with an automatic transmission of a vehicle and the like and which is used in a power transmitting mechanism at an output side of an engine.

2. Related Background Art

FIGS. 3 and 4 show an example of a conventional damper apparatus. This apparatus will be explained hereinbelow. FIG. 3 is a front view of the conventional damper apparatus, and FIG. 4 is a sectional view taken along the line 4—4 in FIG. 3.

A damper apparatus 51 comprises a retainer plates 71, 72 having peripheral portions interconnected by rivets 73, a plurality of sets of small and large springs 81, 82 (one small spring 81 and one large spring 82 constitute one set) disposed at predetermined position within an annular cavity defined by the retainer plates 71, 72, piece members 65 each of which is disposed between adjacent sets of springs 81, 82 and is movable in the cavity defined by the retainer plates 71, 72 and a plate 61 having pawls 63 elastically engaged by the springs 81, 82. Further, the retainer plate 81 is provided with bent portions 75 for regulating movements of the springs 81, 82.

The damper apparatus 51 is assembled in such a manner that the damper apparatus is attached to one of opponent members by the rivets 73 inserted into holes 74 provided in the retainer plates 71, 72 and is attached to the other of the opponent members by splines formed on an inner periphery of the plate 61.

However, since the above-mentioned damper apparatus 51 is attached to the opponent member by the rivets 73, as shown in FIG. 4, it is necessary that outer peripheral edge portions of the retainer plates 71, 72 having holes 74 be parallel with the opponent member and that a certain amount of a width of each parallel portion be maintained, thereby giving rise to a problem that the diameter of the damper apparatus becomes great.

SUMMARY OF THE INVENTION

Accordingly, an object of the present invention is to provide a damper apparatus in which a diameter is reduced.

To achieve the above object, a damper apparatus according to the present invention comprises a spring, a holder for holding the spring, and a plate having a pawl elastically engaged by the spring, the damper apparatus being characterized in that splines are provided on an inner peripheral portion and an outer peripheral portion of the damper apparatus.

Further, the holder may be constituted by pinching an annular ring between two retainer plates.

Splines having common configuration may be provided on outer peripheries of two retainer plates, and splines may also be provided on an inner periphery of the plate having the pawl.

Further, the number of locations where the retainer plates and the ring are interconnected is increased in comparison with that in the conventional technique, and a diameter of each rivet is made smaller. With this arrangement, a diameter of the damper apparatus can be reduced.

BRIEF DESCRIPTION OF THE DRAWINGS

FIG. 1 is a front view of a damper apparatus according to an embodiment of the present invention;

FIG. 2 is a sectional view taken along the line 2—2 in FIG. 1;

DETAILED DESCRIPTION OF THE PREFERRED EMBODIMENTS

Figure 4:
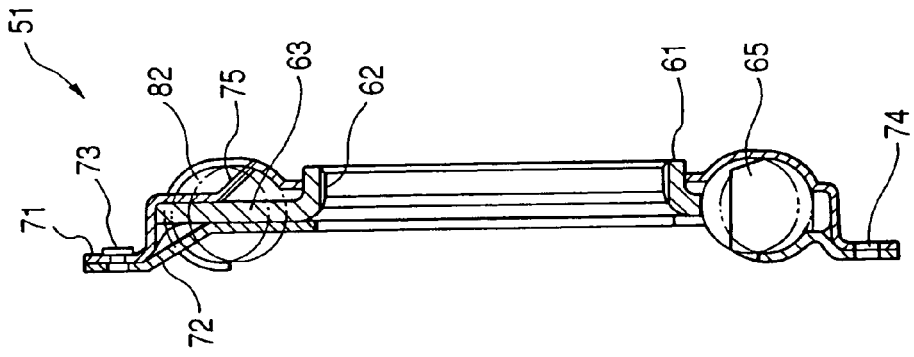
FIG. 4 is a sectional view taken along the line 4—4 in FIG. 3.
Figure 3:
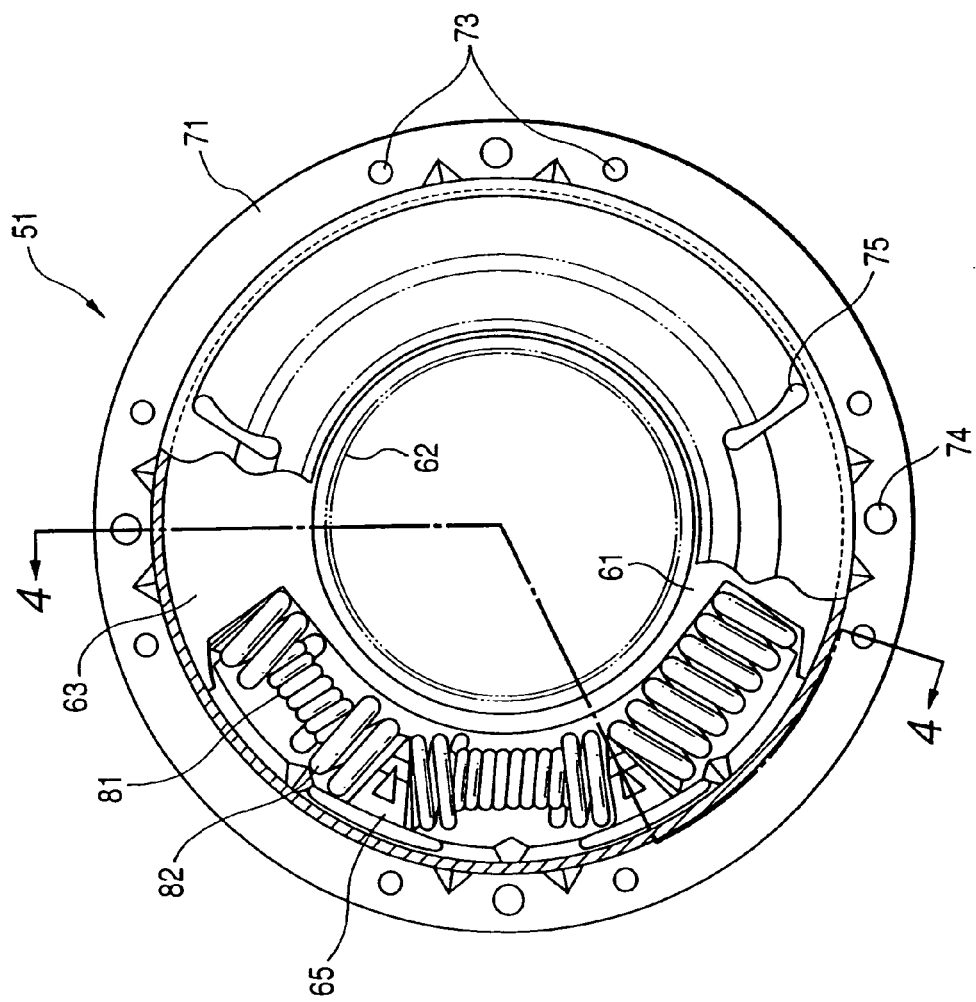
FIG. 3 is a front view of a conventional damper apparatus.

The present invention will now be fully explained in connection with an embodiment thereof with reference to the accompanying drawings. Incidentally, in the drawings, the same elements are designated by the same reference numerals. FIG. 1 is a front view of a damper apparatus according to an embodiment of the present invention, and FIG. 2 is a sectional view taken along the line 2—2 in FIG. 1.

A damper apparatus 1 includes substantially annular retainer plates 11, 12 and a ring 33, which together constitute a holder 35. The holder 35 is provided at its outer periphery with a plurality of splines 42 equidistantly arranged along a circumferential direction. Within a cavity defined by the holder 35, a plurality of sets of small and large springs 31, 32 (one small spring 31 and one large spring 32 constitute one set) are disposed at predetermined positions with intervals substantially equidistant in a circumferential direction. The small spring 31 and the large spring 32 are coil springs having predetermined spring constants, and the small spring 31 is fitted within the large spring 32.

The damper apparatus 1 further includes a substantially annular plate 13 having pawls 14 elastically engaged by the small spring 31 and the large spring 32. Plate 13 further includes a plurality of splines 41 disposed on an inner periphery thereof with intervals substantially equidistant in a circumferential direction. Pieces 15 disposed between adjacent sets of small springs 31 and large springs 32 are movable in the cavity defined by the holder 35. As seen in FIG. 2, the thickness of plate 13 in an axial direction of the damper apparatus (horizontal direction in FIG. 2) is substantially equal to that of ring 33. Thus, as shown, opposite end surfaces of ring 33 are substantially aligned with opposite end surfaces of plate 13 in the axial direction. As also seen in FIG. 2, spline 41 on plate 13 projects radially inwardly from the inner peripheries of the retainer plates 11, 12.

The damper apparatus 1 is installed for use by fitting one of opponent members on the outer splines 42 and by fitting the other of the opponent members on the inner splines 41. Further, the retainer plates 11, 12 and the ring 33 are integrally secured to each other by inserting rivets 23 into axial through-holes 24 provided in these elements (specifically, in their respective splines 42), whereby each rivet 23 is disposed through splines of the retainer plates and an intervening portion 33a of the annular ring 33 between the splines, as shown in FIG. 2. As shown in FIG. 1, the plurality of through-holes 24 are disposed substantially equidistantly along the circumferential direction. Further, since the rivets 23 each having a diameter smaller than that in the prior art are used, the diameters of the retainer plates 11, 12 in a radial direction can be reduced.

The retainer plates 11, 12 are provided with a plurality of bent portions 25 adapted to regulate movements of the small springs 31 and the large springs 32 and arranged at predetermined positions in the circumferential direction. As a result, when torque is transmitted, if vibration is generated between the holder 35 and the substantially annular plate 13, the small springs 31 and the large springs 32 are compressed between the pawls 14 and the bent portions 25, thereby absorbing the vibration.

In the illustrated embodiment, while an example that the splines are provided on the outer periphery of the holder 35 and the inner periphery of the plate 13 having the pawls 14 was explained, the splines may be provided on an inner periphery of the holder and an outer periphery of the plate. That is to say, a damper apparatus according to the present invention can be obtained in such a manner that the pawls 14 are provided on the inner periphery of the plate 13 and the splines are machined on the outer periphery of the plate 13, and further, the holder 35 is assembled by effecting caulking on inner peripheries of the holder. Further, if the diameters of the retainer plates are reduced and the diameter of the ring 33 is increased, the outer splines may be provided on the ring 33.

The above-mentioned damper apparatus 1 is used with a torque converter in an automatic transmission of a vehicle by arranging it in a lock-up piston of the torque converter. Alternatively, the damper apparatus can be used with a starting clutch.

The present invention provides the following advantages.

Since the damper apparatus is interconnected with opponent members via the splines, a diameter of the damper apparatus in the radial direction can be reduced.

Since the holder for holding the springs is constituted by pinching the annular ring between two retainer plates, strength of the damper apparatus can be enhanced, and attaching accuracy can be improved by lengthening axial dimensions of the splines.

What is claimed is:

1. A damper apparatus comprising:

a spring;

a holder holding said spring and including two retainer plates and an annular ring pinched between said retainer plates; and a plate having a pawl elastically engaged by said spring, said plate being interposed between said retainer plates and disposed radially inwardly of said annular ring, wherein an axial thickness of said annular ring and an axial thickness of said plate are substantially equal, splines are provided on an inner peripheral portion of said plate and an outer peripheral portion of said holder, rivets are disposed through said splines of said holder, and said splines of said plate project radially inwardly relative to respective inner peripheries of said retainer plates.

2. A damper apparatus comprising:

a spring;

a holder holding said spring and including two retainer plates and an annular ring disposed between said two retainer plates; and a plate having a pawl elastically engaged by said spring; and wherein splines are provided on an inner peripheral portion of at least one of said plate and said holder and an outer peripheral portion of the other of said plate and said holder, wherein opposite end surfaces of said annular ring are substantially aligned with opposite end surfaces of said plate in an axial direction, wherein said splines provided on said holder include splines provided on said two retainer plates of said holder, and wherein a rivet is disposed through a spline of each of said retainer plates and an intervening portion of said annular ring.

3. A damper apparatus comprising:

a spring;

a holder holding said spring and including two retainer plates and an annular ring pinched between said retainer plates; and a plate having a pawl elastically engaged by said spring, said plate being interposed between said retainer plates and disposed radially inwardly of said annular ring, wherein an axial thickness of said annular ring and an axial thickness of said plate are substantially equal, splines are provided on an inner peripheral portion of said plate and an outer peripheral portion of said holder, rivets are disposed through said splines of said holder, said splines of said plate project radially inwardly relative to respective inner peripheries of said retainer plates, and said rivets are also disposed through portions of said annular ring between said splines of said holder.

* * * * *